(12) United States Patent
Cheng et al.

(10) Patent No.: US 11,543,326 B2
(45) Date of Patent: Jan. 3, 2023

(54) METHOD AND SYSTEM FOR PERFORMING FAULT DIAGNOSIS BY BEARING NOISE DETECTION

(71) Applicant: Aktiebolaget SKF, Gothenburg (SE)

(72) Inventors: Gang Cheng, Shanghai (CN); Linhui Liu, Shanghai (CN)

(73) Assignee: Aktiebolaget SKF, Gothenburg (SE)

( * ) Notice: Subject to any disclaimer, the term of this patent is extended or adjusted under 35 U.S.C. 154(b) by 0 days.

(21) Appl. No.: 17/402,007

(22) Filed: Aug. 13, 2021

(65) Prior Publication Data

US 2022/0099527 A1 Mar. 31, 2022

(30) Foreign Application Priority Data

Sep. 29, 2020 (CN) .......................... 202011051999.4

(51) Int. Cl.
*G01M 13/045* (2019.01)
*G01H 17/00* (2006.01)

(52) U.S. Cl.
CPC .......... *G01M 13/045* (2013.01); *G01H 17/00* (2013.01)

(58) Field of Classification Search
None
See application file for complete search history.

(56) References Cited

U.S. PATENT DOCUMENTS

2010/0169030 A1* 7/2010 Parlos .................. G01R 31/343
702/58

* cited by examiner

*Primary Examiner* — Raul J Rios Russo
*Assistant Examiner* — Carl F. R. Tchatchouang
(74) *Attorney, Agent, or Firm* — Garcia-Zamor Intellectual Property Law; Ruy Garcia-Zamor; Bryan Peckjian (57) ABSTRACT

The present disclosure provides a method and system for performing fault diagnosis by bearing noise detection. The method provides: collecting noise in bearing detection, the noise comprising bearing noise and operating condition noise; subjecting the collected noise to pre-processing, to obtain a first time domain signal and a second frequency domain signal; and inputting the first time domain signal and second frequency domain signal to a bearing fault diagnosis model. The bearing fault diagnosis model includes a characteristic extraction model and a fault discrimination model, the characteristic extraction model subjects the first time domain signal and second frequency domain signal to characteristic extraction separately to obtain a first characteristic associated with a time domain shock peak and a second characteristic associated with a fault frequency peak. Moreover, the fault discrimination model combines the first characteristic and second characteristic, and performs fault discrimination on the basis of a combined characteristic.

10 Claims, 4 Drawing Sheets

METHOD AND SYSTEM FOR PERFORMING FAULT DIAGNOSIS BY BEARING NOISE DETECTION

CROSS-REFERENCE TO RELATED APPLICATIONS

This application claims priority to Chinese patent application no. 202011051999.4, filed Sep. 29, 2020, the contents of which is fully incorporated herein by reference.

TECHNICAL FIELD

The present invention relates to the field of bearing noise detection, and in particular to a method and system for performing fault diagnosis by bearing noise detection.

BACKGROUND ART

Bearing noise is a key parameter in bearing quality control; certain early-stage bearing defects can be detected by bearing noise detection in the production line. However, there is a strong correlation between noise and bearing type; for example, different bearing types exhibit differences in bearing dimensions, material and grease, etc., and noise varies because of this. Thus, a trained detection model for a particular type of bearing cannot be used for other new types of bearing directly.

Another problem with typical bearing noise detection models is that detection is completely dependent on certain key parameters of the bearing, such as fault frequency (BPFI, BPFO, etc.) and relatively stable and accurate rotation speed information. However, in some cases, information of these parameters is very difficult to collect, e.g. information relating to bearing type is lacking or bearing speed information is lacking.

Existing bearing detection algorithms need to collect a large amount of bearing data relating to bearing information in order to retrain a model for a new type of bearing. This not only wastes time and costs, but also cannot support rapid expansion in an ever increasing number of new applications. In addition, in cases where bearing type and speed information is absent, specialized personnel need to perform diagnosis manually, or diagnosis needs to be performed with very simple diagnosis logic (e.g. RMS threshold or trend); thus, detection efficiency and detection precision are relatively low.

Thus, there is a need to develop a universal method and system which are capable of performing fault determination by automatic bearing noise detection without the need for bearing information, so as to increase the efficiency of bearing noise detection by increasing the generalization capability of an automatic detection model for bearing noise.

SUMMARY OF THE INVENTION

One or more embodiments of the present invention provides a method for performing fault diagnosis by bearing noise detection. The method includes: collecting noise in bearing detection, the noise comprising bearing noise and operating condition noise; subjecting the collected noise to pre-processing, to obtain a first time domain signal and a second frequency domain signal; and inputting the first time domain signal and second frequency domain signal to a bearing fault diagnosis model to perform fault diagnosis. The bearing fault diagnosis model comprises a characteristic extraction model and a fault discrimination model, the characteristic extraction model subjects the first time domain signal and second frequency domain signal to characteristic extraction separately to obtain a first characteristic associated with a time domain shock peak and a second characteristic associated with a fault frequency peak. Moreover, the fault discrimination model combines the first characteristic and second characteristic, and performs fault discrimination on the basis of a combined characteristic.

A step of subjecting a collected bearing vibration signal to pre-processing may include: subjecting the collected bearing vibration signal to bandpass filtering. The step of subjecting the collected noise to pre-processing may further comprise acquiring time domain waveform data of a filtered signal to serve as the first time domain signal, and subjecting the filtered signal to a Fourier transform and acquiring envelope spectrum data of the Fourier transformed signal to serve as the second frequency domain signal. Optionally, the pre-processing may further comprise normalizing the first time domain signal and second frequency domain signal separately. Optionally, the pre-processing may further comprise resampling the normalized first time domain signal and second frequency domain signal.

The characteristic extraction model may include models for separately processing the time domain signal and frequency domain signal, e.g. a first sub-model for processing the first time domain signal and a second sub-model for processing the second frequency domain signal.

The method may further include: based on the first time domain signal, the first sub-model using a convolution kernel to separately extract first peak value data and first mean value data; and based on the second frequency domain signal, the second sub-model using a convolution kernel to extract second peak value data and second mean value data. The first peak value data represents a noise shock at a specific time in the time domain, and the first mean value data represents average operating condition noise in the time domain. The second peak value data represents a noise shock on a specific spectrum in the frequency domain, and the second mean value data represents average operating condition noise in the frequency domain.

The method may further provide: combining the first peak value data and first mean value data, to obtain the first characteristic; and combining the second peak value data and second mean value data, to obtain the second characteristic.

The characteristic extraction model may be a model based on a convolutional neural network (CNN) and the fault discrimination model may be a model based on a fully connected network.

The first time domain signal may be a time domain envelope, and the second frequency domain signal may be a spectrum envelope.

The method may further comprise establishing a fault mode data set on the basis of a historical fault mode, and storing a discriminated fault mode in order to update the fault mode data set.

One or more embodiment of the present invention provides a system for performing fault diagnosis by bearing noise detection. The system provides a data collector, a processor and a memory. The data collector is configured to collect noise in bearing detection, the noise comprising bearing noise and operating condition noise. The processor is connected to the data collector and is configured to perform pre-processing of the collected noise, to obtain a first time domain signal and a second frequency domain signal. The processor is further configured to input the first time domain signal and second frequency domain signal to a bearing fault diagnosis model to perform bearing fault discrimination. The bearing fault diagnosis model provides a characteristic extraction model and a fault discrimination model. The processor is configured such that the first time domain signal and second frequency domain signal are subjected to characteristic extraction separately by means of the characteristic extraction model, to obtain a first characteristic associated with a time domain shock peak and a second characteristic associated with a fault frequency peak; and the first characteristic and second characteristic are combined by means of the fault discrimination model, and fault discrimination is performed on the basis of a combined characteristic. The memory is configured to be connected to the processor and store an obtained fault identification result in order to update an original fault database.

One or more embodiment of the present invention provides a computer readable storage medium comprising instructions executed by a computer to implement the method described above for performing fault diagnosis by bearing noise detection.

Advantageously, the method and system disclosed in the present invention for performing fault diagnosis by bearing noise detection enable fault judgement to be performed by automatic bearing noise detection without the need for bearing information, so as to increase the precision and efficiency of bearing noise detection by increasing the generalization capability of the bearing noise automatic detection model.

BRIEF DESCRIPTION OF THE DRAWINGS

The system can be better understood by referring to the following description in conjunction with the drawings. The components in the drawings are not to scale; the emphasis is on explaining the principles of the present invention. In addition, in the drawings, similar or identical reference numerals represent similar or identical elements.

DETAILED DESCRIPTION OF THE INVENTION

It should be understood that the following description of the presented embodiments is merely intended for illustrative purposes, without being restrictive. The division of examples in the functional blocks, modules or units shown in the drawings should not be interpreted as meaning that these functional blocks, modules or units must be implemented as physically separate units. The functional blocks, modules or units that are shown or described may be implemented as independent units, circuits, chips, functions, modules or circuit elements. One or more functional blocks or units may also be implemented in a common circuit, chip, circuit element or unit.

Figure 1:
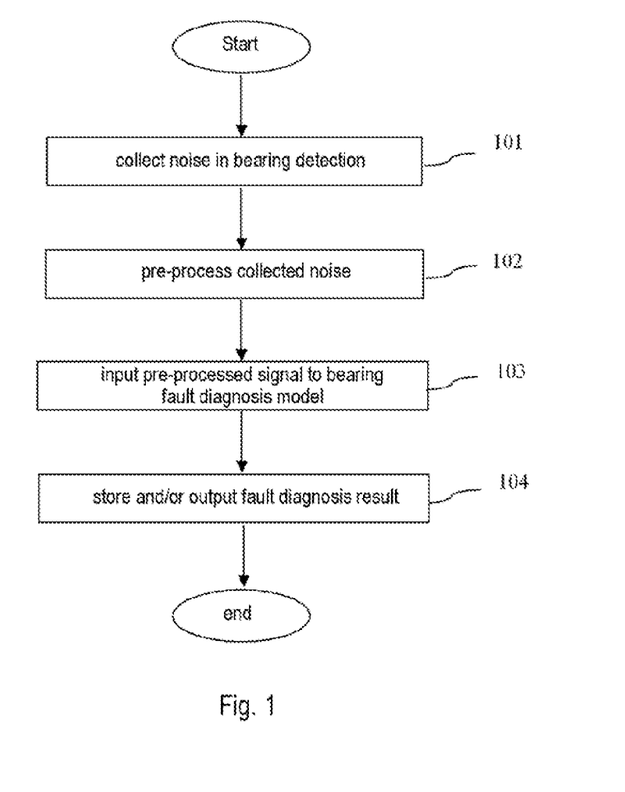
FIG. 1 shows schematically a flow chart for a method for performing fault identification by detection of bearing noise according to one or more embodiment of the present invention.

FIG. 1 shows schematically a flow chart for a method for performing fault identification by detection of bearing noise according to one or more embodiment of the present invention.

Referring to FIG. 1, in S103, noise in bearing detection can be collected by means of a sensor, e.g. one or more vibration sensor; the noise provides bearing noise caused by a bearing fault, and further provides operating condition noise. In S102, a noise signal collected by means of a sensor can be pre-processed. In S103, the pre-processed signal is inputted to a bearing fault diagnosis model to perform diagnosis. Optionally, in S104, a fault diagnosis result is stored and/or outputted. For example, the outputted fault diagnosis result can be displayed to an operator/user by means of a display device, or an alarm sound is emitted by means of an alarm apparatus to alert the operator/user that a bearing fault has been detected, or the fault diagnosis result is stored in order to be displayed to the operator/user when called by the operator/user.

Figure 2:
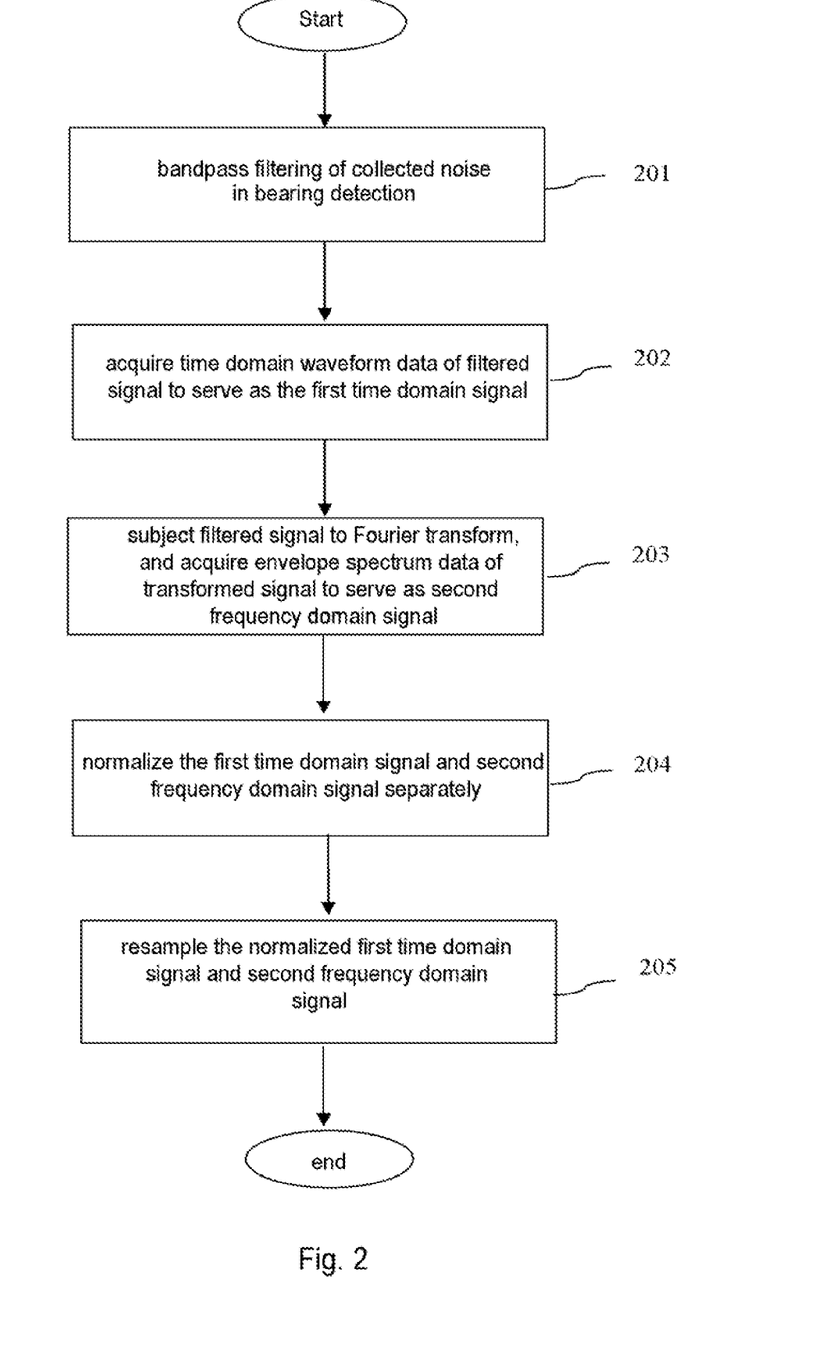
FIG. 2 shows schematically a flow chart of a method for pre-processing collected bearing noise according to one or more embodiment of the present invention.

FIG. 2 shows schematically an exemplary method flow chart for pre-processing collected bearing noise data according to one or more embodiment of the present invention.

First of all, in S201, a collected noise signal can be filtered. For example, the noise signal can be filtered by using a bandpass filter with a bandwidth of 500 Hz-10000 Hz. In actual operation, the bandwidth range of the bandpass filter can be adjusted according to the actual situation; for example, the bandwidth of the bandpass filter can be adjusted on the basis of at least one of operating condition rotation speed and load.

Next, the filtered noise signal undergoes two processing procedures in parallel. In one processing procedure, the filtered signal is processed in the time domain; in the other processing procedure, the filtered signal is processed in the frequency domain. For example, in S202, time domain waveform data (i.e. time sequence data) of the filtered signal can be acquired as a first time domain signal. For example, in S203, the filtered signal can be subjected to a Fourier transform, to convert the filtered time domain signal to a frequency domain signal, and spectrum envelope data (e.g. ENV data) of the frequency domain signal is calculated as a second frequency domain signal.

In S204, the time domain waveform data (time domain envelope data) and frequency domain spectrum envelope data can be normalized. Furthermore, the time domain waveform data and frequency domain spectrum envelope data are resampled separately at a constant length, according to an input signal length requirement of the bearing fault diagnosis model. For example, a preferred constant length is generally 128*128. However, those skilled in the art will understand that other constant lengths can be used in a matching fashion, according to actual needs and the particular design of the bearing fault diagnosis model. Next, the resampled time domain waveform data and frequency domain spectrum envelope data are inputted to the bearing fault diagnosis model, to perform fault identification. Those skilled in the art will understand that the data pre-processing steps described above can be performed sequentially and/or in parallel.

Figure 3:
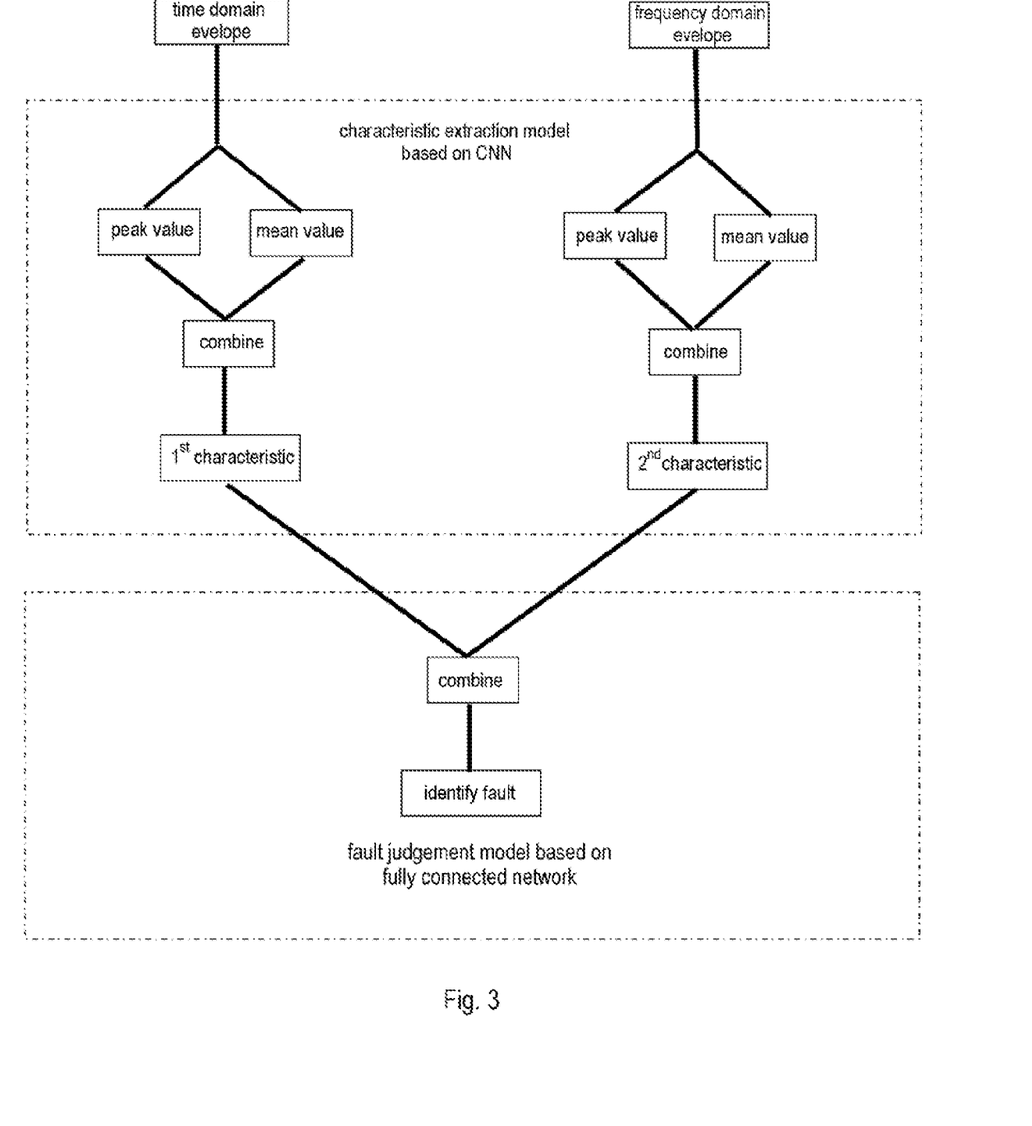
FIG. 3 shows schematically a simplified diagram of a bearing fault diagnosis model according to one or more embodiment of the present invention.

Bearing fault diagnosis models designed according to some embodiments of the present invention are presented below with reference to FIGS. 3 and 4. The design of the bearing fault diagnosis models in some embodiments of the present invention is based on a depth neural network. FIG. 3 is a simplified schematic diagram of a bearing fault diagnosis model according to one or more embodiment of the present invention. As shown in FIG. 3, the bearing fault diagnosis model of the present invention can be divided into two parts: the first part is a characteristic extraction model based on a convolutional neural network (CNN), and the second part is a fault discrimination model based on a fully connected network. In addition, the bearing fault diagnosis model in this embodiment simultaneously takes into account two types of data input, i.e. time domain envelope signal data and frequency domain envelope spectral line data, and by subjecting two modes of a time domain shock peak and a frequency domain fault frequency peak to automatic characteristic extraction simultaneously, a fault is finally identified. Specifically, using a pooling technique in a convolutional network, a specific pooling function (e.g. maximum value function) is selected, a local peak value of spectral lines after convolution is extracted, and a stable peak value characteristic is extracted by multiple stages of convolution. The peak value itself represents a shock at a specific time or on a specific spectrum, and this shock is often caused by a fault in a part of a device (e.g. a bearing fault); normal bearings generally do not exhibit obvious shocks. Furthermore, another pooling function (e.g. mean value) is selected at the same time, and a mean value of spectral lines after convolution is extracted, representing average energy in the time domain and frequency domain; this often represents average operating condition vibration and/or noise, and as the bearing fault becomes more and more obvious, the overall noise in the detection process will also steadily increase. The characteristic related to a fault shock (e.g. local peak value) and the characteristic related to average bearing noise/vibration (e.g. local mean value) are extracted from the two different envelope lines of the time domain/frequency domain by means of the characteristic extraction model, and are effective parameters for judging the state of health of the bearing. Generally, with good bearing conditions, the average vibration of a bearing is very minor, and the characteristic related to a fault shock will be very obvious in both the frequency domain and the time domain, thus being easy to detect; however, detection based on this characteristic alone will also readily result in premature discrimination, such that a bearing fault is discriminated as being too serious, giving rise to unnecessary wastage, such as an excessive defect rate or additional maintenance/detection costs, etc. However, as the state of health of the bearing steadily deteriorates, not only will the local shock increase, but the average noise of the bearing will also increase accordingly. The manifestation of these fault characteristics will be considerably different in the time domain and frequency domain, sometimes not being obvious in the time domain but being highlighted in the frequency domain. In addition, based on complex factors, detection based on the above solution using a fixed threshold will not give an ideal result. In the above embodiments of the present invention, based on an algorithm model such as a neural network, it is possible to learn labelled information of different states from a large amount of data, and finally accomplish model convergence, to achieve a good identification rate. It must be explained that although the above embodiments of the present invention mainly take neural networks as examples, these examples are not intended to be restrictive; any solution that uses an algorithm model similar to a neural network and implements the present invention based on the spirit and thinking, etc. presented in the above embodiments of the present invention should be included in the scope thereof.

Referring to FIG. 3, the abovementioned pre-processed data described with reference to FIG. 2 is inputted as input data to the first part of the bearing fault diagnosis model, i.e. the characteristic extraction model based on the CNN network. The characteristic extraction model of the present invention provides two independent branch sub-models, for independently processing the inputted time domain envelope and frequency domain envelope respectively. The two independent branch sub-models can subject the time domain signal and frequency domain signal to characteristic extraction separately.

For example, FIG. 3 (the left half) shows schematically a first sub-model for subjecting the time domain signal to characteristic extraction; the first sub-model uses a convolution kernel to extract a local peak value and a mean value in parallel from time domain envelope spectral lines. The local peak value represents a possible fault shock, and the local mean value represents a noise level under an operating condition. Having undergone convolution, the peak value and the mean value are self-extracted key characteristics for fault detection. In order to explain the principles in an exemplary way, FIG. 3 omits a multi-layer network structure, only schematically showing a network structure in the form of a simplified diagram, but in actual operation, a multi-layer network can often be designed according to the actual situation, in order to ensure the stability of extraction of various peak values, and reduce the sensitivity of the peak value to spectral position. The local peak value and mean value obtained via the multi-layer network are combined, in order to calculate a first characteristic of the first sub-model, said first characteristic being associated with a time domain shock peak.

Similarly, FIG. 3 (the right half) shows schematically a second sub-model for subjecting the frequency domain signal to characteristic extraction; the second sub-model likewise uses a convolution kernel to extract a local peak value and a mean value from frequency domain envelope spectral lines. Furthermore, the local peak value and mean value obtained via a multi-layer network are combined, in order to calculate a second characteristic of the second sub-model, said second characteristic being associated with a fault frequency peak.

Next, the calculated first characteristic of the first sub-model and the calculated second characteristic of the second sub-model are inputted to the fault discrimination model based on a fully connected network, and the characteristics are combined. Furthermore, by combining the fault shock characteristic and operating condition noise characteristic, the multi-layer fully connected network is finally used to accomplish characteristic-based fault discrimination. The multi-layer fully connected network realizes a special classifier, being able to correctly distinguish between a normal bearing and a faulty bearing according to fault and operating condition noise; a faulty bearing often has more shock characteristics and louder operating condition noise.

Figure 4:
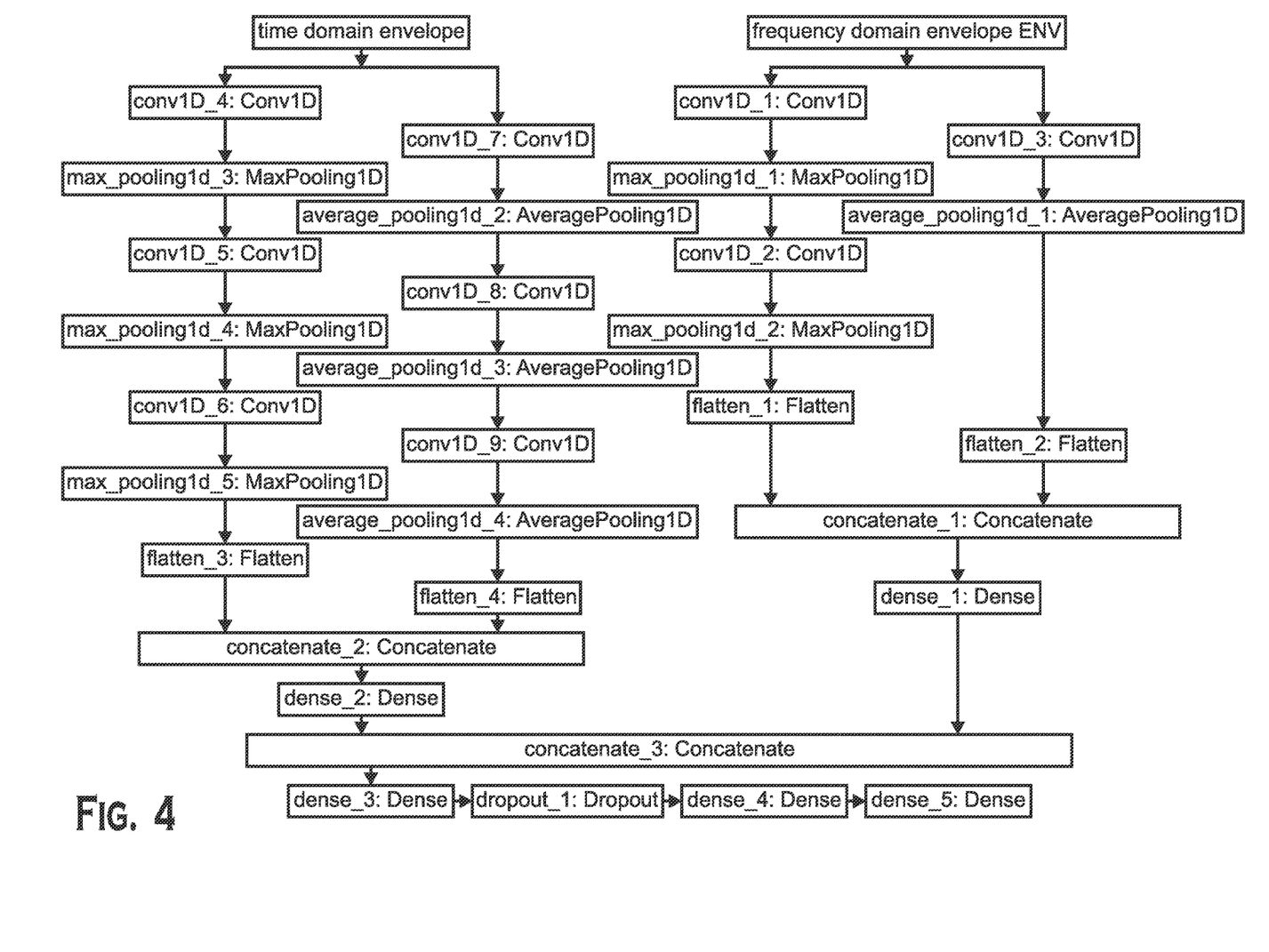
FIG. 4 shows schematically a network model example of a bearing fault diagnosis model according to the present invention.

FIG. 4 shows a deep neural network model of an exemplary bearing fault diagnosis model of the present invention. The model provides two parts: the first part is a characteristic extraction model based on a convolutional neural network (CNN), and the second part is a fault discrimination model based on a fully connected network. The characteristic extraction model based on the CNN provides two independent branch sub-models, for independently processing the inputted time domain envelope and frequency domain envelope respectively. The two independent branch sub-models can subject the time domain signal and frequency domain signal of the bearing vibration signal to characteristic extraction separately in parallel.

The first sub-model for subjecting the time domain signal to characteristic extraction may provide multiple convolution layers, e.g. convolution layers conv1D_4: Conv1D, conv1D_5: Conv1D and conv1D_6: Conv1D for extracting a local peak value by convolution, and convolution layers conv1D_7: Conv1D, conv1D_8: Conv1D and conv1D_9: Conv1D for extracting a local mean value by convolution. The convolution layers use a convolution kernel to subject a local region of an input signal or characteristic to convolution calculation, in order to extract the required key characteristic information.

The first sub-model further provides multiple pooling layers. The main function of the pooling layers is to reduce the number of parameters, and reduce the number of original characteristics. The convolution layers have already reduced the number of connections in the neural network to a very large extent, but for neurons in a characteristic mapping set, the number is not significantly reduced, and the subsequent input dimensionality is still quite high, easily leading to overfitting, so the convolution layers are generally used in conjunction with pooling layers, and it is thus possible to effectively reduce the dimensionality of the characteristics. In the exemplary model shown in FIG. 4, the first sub-model provides maximum pooling layers for extracting a local peak value, e.g. max_pooling1d_3: MaxPooling1D, max_pooling1d_4: maxPooling1D and max_pooling1d_5: MaxPooling1D, and average pooling layers average_pooling1d_2: AveragePooling1D, average_pooling1d_3: AveragePooling1D and average_pooling1d_4: AveragePooling1D for extracting a mean value.

Those skilled in the art will understand that FIG. 4 merely shows demonstratively a multi-layer structure of convolution layers and pooling layers; in actual operation, a greater or smaller number of convolution layers and pooling layers can be designed according to different needs.

Next, for example, data representing a local peak value and outputted from the maximum pooling layer max_pooling1d_5: MaxPooling1D is flattened to one-dimensional peak value data in a flattening layer flatten_3: Flatten, and data representing a mean value and outputted from the average pooling layer average_pooling1d_4: AveragePooling1D is flattened to one-dimensional mean value data in a flattening layer flatten_4: Flatten. The one-dimensional peak value data and one-dimensional mean value data resulting from flattening are combined in a combining layer concatenate_2: Concatenate, in order to extract a first characteristic of the first sub-model.

After passing through a dense layer dense_2: Dense, the first characteristic is inputted to a combining layer concatenate_3: Concatenate, to be combined with a second characteristic extracted from the second sub-model which subjects the frequency domain signal to characteristic extraction.

Similarly, the second sub-model for subjecting the frequency domain signal to characteristic extraction may also provide multiple convolution layers, e.g. convolution layers conv1D_1: Conv1D and conv1D_2: Conv1D for extracting a local peak value by convolution, and a convolution layer conv1D_3: Conv1D for extracting a local mean value by convolution. The second sub-model may also provide multiple pooling layers, e.g. maximum pooling layers max_pooling1d_1: MaxPooling1D and max_pooling1d_2: maxPooling1D for extracting a local peak value, and an average pooling layer average_pooling1d_1: AveragePooling1D for extracting a mean value.

For example, the frequency domain signal entering the second sub-model passes through the convolution layer conv1d_1: Conv1D and the pooling layer max_pooling1d_1: MaxPooling1D and then goes through conv1d_2: Conv1D and max_pooling1d_2: maxPooling1D in one branch. Data representing a local peak value and outputted from the maximum pooling layer max_pooling1d_2: MaxPooling1D is flattened to one-dimensional peak value data in a layer flatten_1: Flatten.

At the same time, the frequency domain signal entering the second sub-model passes through the convolution layer conv1D_3: Conv1D and the average pooling layer average_pooling1d_1: AveragePooling1D in the other branch, and then data representing a mean value and outputted from the average pooling layer does not pass through another convolution layer and another pooling layer, but instead is flattened to one-dimensional mean value data in a layer flatten_2: Flatten directly.

Next, the one-dimensional peak value data and one-dimensional mean value data resulting from flattening are combined in a combining layer concatenate_1: Concatenate, in order to extract a second characteristic of the second sub-model. After passing through a dense layer dense_1: Dense, the second characteristic is inputted to the combining layer concatenate_3: Concatenate, to be combined with the first characteristic extracted from the first sub-model.

As can be seen, the numbers of convolution layers and pooling layers may be different in the two sub-models, and the numbers of maximum pooling layers and average pooling layers may be different in the same sub-model. Those skilled in the art will understand that the numbers of the convolution layers and pooling layers will vary depending on the particular actual operation. Likewise, the numbers of the combining layers, flattening layers and dense layers can also vary depending on the particular requirements, or some of these layers can be omitted.

The first characteristic extracted via the first sub-model and the second characteristic extracted via the second sub-model are inputted to the fault discrimination model based on the fully connected network, and are first combined in the combining layer concatenate_3: Concatenate. By combining the fault shock characteristic and operating condition noise characteristic, and further by means of the multi-layer fully connected network comprising for example dense_3: Dense, dropout_1: Dropout, dense_4: Dense and dense_5: Dense, characteristic-based fault discrimination is accomplished.

The bearing fault diagnosis model designed in accordance with the above embodiments of the present invention enables an automatic bearing fault diagnosis model to be realized without any bearing information or speed information. When constructing the bearing fault diagnosis model of the present invention, typical fault modes can be collected from all historical fault databases, to form a fault mode original data set, for the purpose of training the fault diagnosis model in the above embodiments of the present invention. The fault diagnosis model in the above embodiments of the present invention diagnoses a bearing fault merely by comparing the specific pattern or shape of the vibration (noise) waveform in bearing detection with the typical fault mode, without the need for any detailed bearing information or speed information. In most cases, the waveform shape and specific pattern are much more important than the absolute amplitude value. When training is performed, it is likewise necessary to subject the original data set to pre-processing before the fault mode original data set is inputted to the neural network model of the present invention.

The pre-processing method is the same as the pre-processing method described with reference to FIG. 2 above, so is not described again here. In addition, in order to expand the training data set, it is also possible to randomly extract spectrum envelope curve data and time sequence curve data of the data from the historical fault database, and white noise is randomly added in order to generate more training data sets. At the same time, the fault type data detected in actual detection can also be continuously stored in the original data set, in order to expand and update the original training data set.

The special bearing fault diagnosis model structure designed in the present invention can provide better generalization capability. The model structure can be used directly for different bearing types, lubricating grease types, seal types, etc. Furthermore, the fault diagnosis model structure of the present invention can be used not only in bearing manufacture, but also in a fault diagnosis process of any mechanical structure comprising a bearing, so as to achieve automatic diagnosis. The method of the present invention is also suitable for establishing a model in a public cloud, and connecting to any client to diagnose a bearing fault in the absence of bearing type. For example, the bearing noise detection method of the present invention can be used for diagnosing faults in the main bearings in a wind turbine, without the need for turbine type and bearing information, thereby vastly reducing the computation time and cost, and in turn increasing the detection efficiency. The method of the present invention can also be expanded to different applications, e.g. gearbox fault detection, unbalanced fault detection, etc.

One or more embodiment of the present invention also provides a system for bearing noise detection. The system provides a data collector, e.g. a vibration sensor. The data collector is configured to collect vibration (noise) signals in bearing detection. The system of the present invention may also provide a processor connected to the data collector. The processor of the present invention may as a whole be a microprocessor, an application-specific integrated circuit (ASIC), a system on a chip (SoC), a computing device, a mobile computing device (e.g. a tablet computer or mobile phone), etc.

The processor may be configured to perform the following method: subject collected vibration (noise) signals to pre-processing, in order to obtain a time domain signal and a frequency domain signal; and inputting the time domain signal and frequency domain signal to a bearing fault diagnosis model. The bearing fault diagnosis model provides a characteristic extraction model and a fault discrimination model; the characteristic extraction model subjects the time domain signal and frequency domain signal to characteristic extraction separately, in order to obtain a first characteristic associated with a time domain shock peak and a second characteristic associated with a fault frequency peak.

The fault discrimination model combines the first characteristic and second characteristic, to obtain a fault identification result. The system may further provide a memory connected to the processor. The memory can store an original fault data set and can store the obtained fault identification result so as to update the original fault data set.

Any one or more of the processor, memory or system described herein provides computer executable instructions which can be compiled or interpreted from computer programs created using various programming language and/or techniques. Generally, the processor (e.g. microprocessor) receives instructions from the memory or a computer readable medium, etc., for example, and executes the instructions.

The processor provides a non-transient computer readable storage medium capable of executing software program instructions. The computer readable medium can be, but is not limited to, an electronic storage device, magnetic storage device, optical storage device, electromagnetic storage device, semiconductor storage device, or any suitable combination thereof.

A description of embodiments has been presented for explanatory and descriptive purposes. Suitable amendments and changes to the embodiments can be performed in view of the above description or obtained by an implementation method. For example, unless otherwise stated, one or more the methods described can be performed by a suitable device and/or system combination. The method can be performed in the following manner: using one or more logic device (e.g. a processor) in combination with one or more other hardware element (such as a storage device, memory, circuit or hardware network interface, etc.) to perform the stored instructions.

The method and associated actions can also be performed in parallel and/or simultaneously in various orders in addition to the order described in the present application. The system is essentially exemplary, and may provide other elements and/or omit elements. The subject matter of the present disclosure provides all novel and non-obvious combinations of the various disclosed methods and system configurations and other features, functions and/or properties.

As used herein, an element or step listed in singular form and preceded by the word "a" should be understood as not excluding a plurality of the element or step, unless such exclusion is indicated. In addition, references to "an embodiment" or "an example" in the present disclosure are not intended to be interpreted as excluding the existence of other embodiments also incorporating the listed features. The present invention has been described above with reference to specific embodiments. However, those skilled in the art will understand that various amendments and changes can be made thereto without departing from the broader spirit and scope of the present invention as stated in the attached claims.

The invention claimed is:

1. A method for performing fault diagnosis by bearing noise detection, comprising:
   collecting noise in bearing detection, the noise comprising bearing noise and operating condition noise;
   subjecting the collected noise to pre-processing, to obtain a first time domain signal and a second frequency domain signal; and
   inputting the first time domain signal and second frequency domain signal to a bearing fault diagnosis model;
   wherein the bearing fault diagnosis model provides a characteristic extraction model and a fault discrimination model, the characteristic extraction model subjects the first time domain signal and second frequency domain signal to characteristic extraction separately to obtain a first characteristic associated with a time domain shock peak and a second characteristic associated with a fault frequency peak; and the fault discrimination model combines the first characteristic and second characteristic, and performs fault discrimination on the basis of a combined characteristic.

2. The method according to claim 1, wherein the characteristic extraction model provides a first sub-model for processing the first time domain signal to obtain the first characteristic, and a second sub-model for processing the second frequency domain signal to obtain the second characteristic.

3. The method according to claim 2, wherein
based on the first time domain signal, first peak value data and first mean value data are extracted separately by means of the first sub-model, wherein the first peak value data represents a noise shock at a specific time in the time domain, and the first mean value data represents average operating condition noise in the time domain; and
based on the second frequency domain signal, second peak value data and second mean value data are extracted separately by means of the second sub-model, wherein the second peak value data represents a noise shock on a specific spectrum in the frequency domain, and the second mean value data represents average operating condition noise in the frequency domain.

4. The method according to claim 3, further comprising:
combining the first peak value data and first mean value data, to obtain the first characteristic; and
combining the second peak value data and second mean value data, to obtain the second characteristic.

5. The method according to claim 1, wherein the characteristic extraction model is a model based on a convolutional neural network (CNN) and the fault discrimination model is a model based on a fully connected network.

6. The method according to claim 1, wherein the first time domain signal is a signal time domain envelope, and the second frequency domain signal is a signal spectrum envelope.

7. The method according to claim 1, further comprising establishing a fault mode data set on the basis of a historical fault mode, and storing a discriminated fault mode in order to update the fault mode data set.

8. The method according to claim 1, wherein the pre-processing comprises:
subjecting the collected noise to bandpass filtering;
acquiring time domain waveform data of a filtered signal to serve as the first time domain signal;
subjecting the filtered signal to a Fourier transform, and acquiring envelope spectrum data of the Fourier transformed signal to serve as the second frequency domain signal;
normalizing the first time domain signal and second frequency domain signal separately; and
resampling the normalized first time domain signal and second frequency domain signal.

9. A system for performing fault diagnosis by bearing noise detection, comprising:
a data collector, configured to collect noise in bearing detection, the noise comprising bearing noise and operating condition noise;
a processor connected to the data collector; the processor being configured to:
subject the collected noise to pre-processing, to obtain a first time domain signal and a second frequency domain signal; and
input the first time domain signal and second frequency domain signal to a bearing fault diagnosis model;
wherein the bearing fault diagnosis model comprises a characteristic extraction model and a fault discrimination model, the characteristic extraction model subjects the first time domain signal and second frequency domain signal to characteristic extraction separately to obtain a first characteristic associated with a time domain shock peak and a second characteristic associated with a fault frequency peak; and the fault discrimination model combines the first characteristic and second characteristic, and performs fault discrimination on the basis of a combined characteristic; and
a memory, configured to be connected to the processor and store a discriminated fault mode in order to update a fault mode data set.

10. A non-transitory computer readable storage medium comprising:
instructions executed by a computer, and
a system for performing fault diagnosis by bearing noise detection by the instructions executed by the computer, the system providing:
a data collector, configured to collect noise in bearing detection, the noise comprising bearing noise and operating condition noise;
a processor connected to the data collector; the processor being configured to:
subject the collected noise to pre-processing, to obtain a first time domain signal and a second frequency domain signal; and
input the first time domain signal and second frequency domain signal to a bearing fault diagnosis model;
wherein the bearing fault diagnosis model comprises a characteristic extraction model and a fault discrimination model, the characteristic extraction model subjects the first time domain signal and second frequency domain signal to characteristic extraction separately to obtain a first characteristic associated with a time domain shock peak and a second characteristic associated with a fault frequency peak; and the fault discrimination model combines the first characteristic and second characteristic, and performs fault discrimination on the basis of a combined characteristic; and
a memory, configured to be connected to the processor and store a discriminated fault mode in order to update a fault mode data set.

* * * * *